(12) United States Patent
Tsuruta et al.

(10) Patent No.: US 11,358,366 B2
(45) Date of Patent: Jun. 14, 2022

(54) AEROGEL STRUCTURE BODY AND METHOD OF MANUFACTURING THE SAME

(71) Applicant: Panasonic Intellectual Property Management Co., Ltd., Osaka (JP)

(72) Inventors: Takashi Tsuruta, Osaka (JP); Rikako Iwasaki, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/241,828

(22) Filed: Apr. 27, 2021

(65) Prior Publication Data

US 2021/0370636 A1  Dec. 2, 2021

(30) Foreign Application Priority Data

May 27, 2020 (JP) .................. JP2020-092600

(51) Int. Cl.
*B32B 5/18* (2006.01)
*B32B 5/24* (2006.01)
*C01B 33/158* (2006.01)

(52) U.S. Cl.
CPC .............. *B32B 5/18* (2013.01); *B32B 5/245* (2013.01); *C01B 33/1585* (2013.01); *B32B 2266/057* (2016.11); *B32B 2266/126* (2016.11); *B32B 2307/304* (2013.01); *B32B 2307/72* (2013.01)

(58) Field of Classification Search
CPC ..... B32B 5/18; B32B 5/245; B32B 2266/057; B32B 2266/126; B32B 2307/304; C01B 33/1585
See application file for complete search history.

(56) References Cited

U.S. PATENT DOCUMENTS

2018/0105472 A1* 4/2018 Ahn ................... C04B 38/0045
2019/0177911 A1   6/2019 Hino et al.

FOREIGN PATENT DOCUMENTS

| JP | 2019-098713 | 6/2019 |
| JP | 2019-138436 | 8/2019 |
| JP | 2019-181809 | 10/2019 |

* cited by examiner

*Primary Examiner* — Hai Vo (74) *Attorney, Agent, or Firm* — McDermott Will & Emery LLP (57) ABSTRACT

An aerogel structure body includes a composite layer containing fibrous materials and aerogel, the aerogel being held between the fibrous materials, and an aerogel layer having a first surface on at least one surface of the composite layer and formed of the aerogel, in which the aerogel layer having a second surface opposite to the first surface, the second surface including a projection portion projecting from the second surface, and a density of the aerogel in the projection portion is 0.1% to 3.0% higher than a density of the aerogel in the aerogel layer (flat portion) other than the projection portion. Therefore, the aerogel structure body that is excellent in dimensional stability and heat insulating properties and that can be manufactured with high productivity and a method of manufacturing the same are provided.

13 Claims, 5 Drawing Sheets

AEROGEL STRUCTURE BODY AND METHOD OF MANUFACTURING THE SAME

BACKGROUND

1. Technical Field

The present disclosure relates to an aerogel structure body and a method of manufacturing the same.

2. Description of the Related Art

As a heat insulating material having high heat insulating performance, an aerogel structure body including aerogel or xerogel (hereinafter, collectively referred to as "aerogel") that is held by fibers such as non-woven fabric is known. Aerogel has pores smaller than a mean free path of air of 68 nm, has less heat conduction due to solid heat conduction or convection, and has high hydrophobicity. Due to such a structure, the aerogel structure body is known to have a heat insulating effect superior to that of air.

In addition, aerogel has characteristics of low mechanical strength and high manufacturing cost. Therefore, the heat insulating material containing aerogel is preferably adopted in a case where the heat insulating material is installed in a narrow space, particularly a case where the heat insulating material is sandwiched between small components, but not a case where a heat insulating material having a large area and a film thickness is required. It is preferable that the heat insulating material installed in such a narrow space has little change in a dimension (thickness).

For example, Japanese Patent Unexamined Publication No. 2019-181809 discloses a method of providing a heat insulating material excellent in dimensional stability and heat insulating properties.

Japanese Patent Unexamined Publication No. 2019-181809 discloses a method of manufacturing a heat insulating material, which includes the following steps. That is, the method of manufacturing a heat insulating material disclosed in Japanese Patent Unexamined Publication No. 2019-181809 includes a step of adjusting an aerogel precursor (raw material mixing step), a step of impregnating a non-woven fabric with a raw material and compounding the impregnated non-woven fabric (impregnation step), and a step of sandwiching a composite between films (film sandwiching step). In addition, the method of manufacturing a heat insulating material includes a step of partially heating the composite to promote a gelation reaction (heating step), a step of pressurizing the composite (pressurization step), and a step of promoting skeletal growth of silica particles (curing step). Furthermore, the method of manufacturing a heat insulating material including a film peeling step, a hydrophobizing step, and a drying step is disclosed.

According to the above described method of manufacturing a heat insulating material, it is possible to manufacture a heat insulating material which is excellent in compressibility and through which a sufficient heat insulating effect can be obtained even in a narrow space in a housing such as an electronic device.

The heat insulating material manufactured by the method disclosed in Japanese Patent Unexamined Publication No. 2019-181809 intentionally forms a raised portion and a flat portion. As a result, it is confirmed that in a case where a desired compressive force is applied to the heat insulating material, the raised portion is preferentially broken by applying pressure, and a heat insulating structure of the remaining flat portion is maintained.

However, in recent years, there has been a demand for a method of manufacturing an aerogel structure body excellent in dimensional stability and heat insulating properties with higher productivity.

SUMMARY

The present disclosure is to provide an aerogel structure body that is excellent in dimensional stability and heat insulating properties and that can be manufactured with high productivity and a method of manufacturing the same.

The aerogel structure body of the present disclosure includes a composite layer that contains fibrous materials and aerogel, the aerogel being held between the fibrous materials, and an aerogel layer having a first surface on at least one surface of the composite layer and formed of the aerogel. The aerogel layer having a second surface opposite to the first surface, the second surface including a projection portion projecting from the second surface. A density of the aerogel in the projection portion is 0.1% to 3.0% higher than a density of the aerogel in the aerogel layer other than the projection portion.

A method of manufacturing an aerogel structure body of the present disclosure includes producing a composite formed of a fibrous material and hydrogel by discharging a sol from a nozzle that moves discontinuously along a direction intersecting a transport direction of the fibrous material onto the fibrous material that is continuously transported, and impregnating the fibrous material with the sol. The method of manufacturing an aerogel structure body includes modifying a surface of the composite, and drying the composite.

According to the present disclosure, it is possible to provide the aerogel structure body that is excellent in dimensional stability and heat insulating properties and that can be manufactured with high productivity and the method of manufacturing the same.

DETAILED DESCRIPTION

Hereinafter, exemplary embodiments of the present disclosure will be described with reference to the drawings.

Exemplary Embodiment

Aerogel structure body 110 according to an exemplary embodiment of the present disclosure will be described separately in terms with reference to FIGS. 1A and 1B.

Figure 1A:
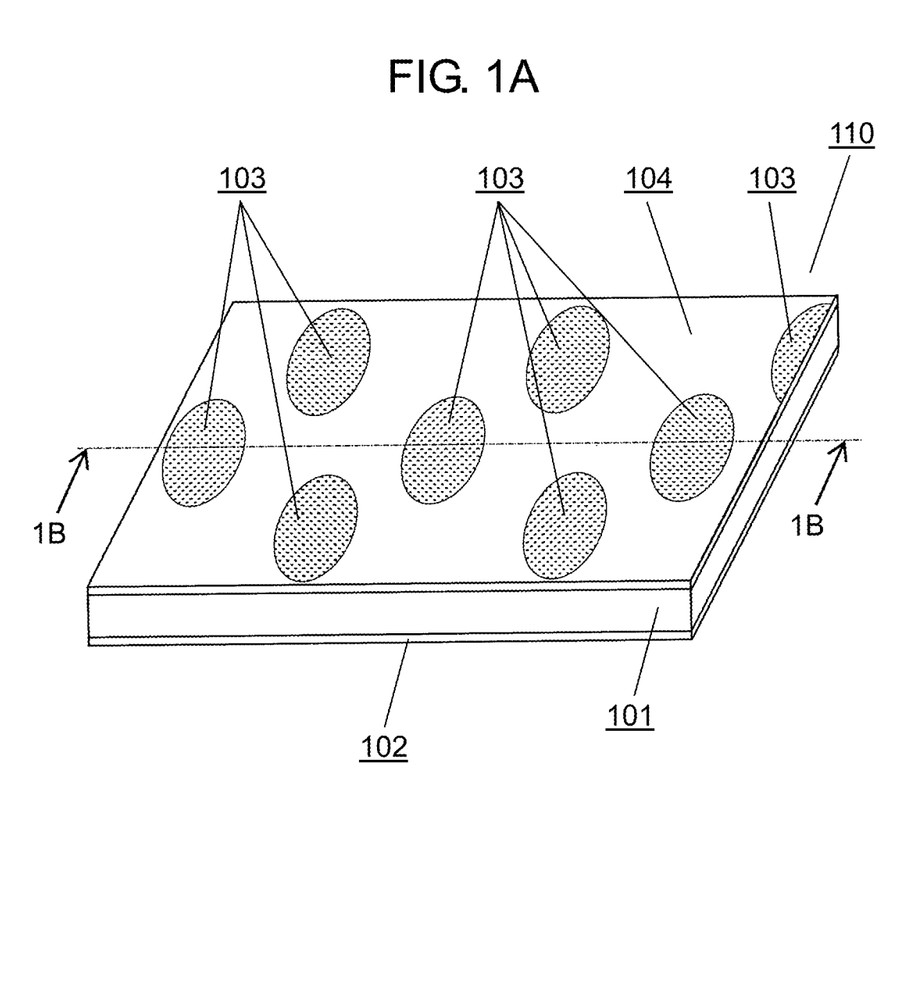
FIG. 1A is a schematic diagram of an aerogel structure body according to an exemplary embodiment of the present disclosure.
Figure 1B:
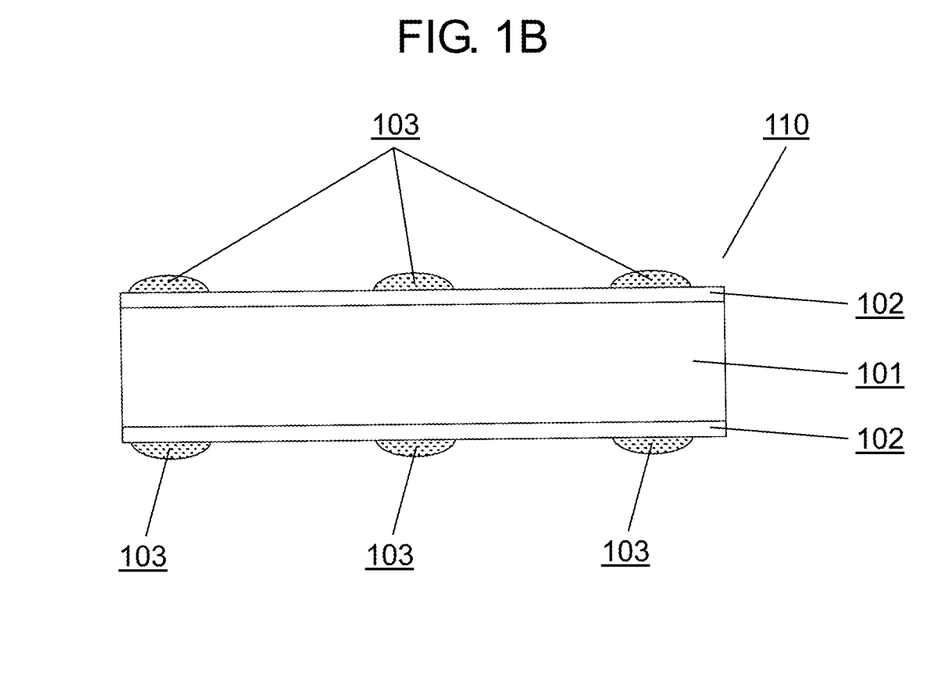
FIG. 1B is a schematic diagram of the aerogel structure body according to the exemplary embodiment of the present disclosure.

FIGS. 1A and 1B are schematic diagrams of aerogel structure body 110 according to the exemplary embodiment of the present disclosure. Specifically, FIG. 1A is a schematic perspective view of aerogel structure body 110. FIG. 1B is a schematic cross-sectional view (1B-1B cross-section) of aerogel structure body 110. The aerogel structure body of the present exemplary embodiment is used as, for example, a heat insulating material.

Structure of Aerogel Structure Body 110

First, a structure of aerogel structure body 110 of the present exemplary embodiment will be described.

As illustrated in FIGS. 1A and 1B, aerogel structure body 110 includes composite layer 101 formed of a fibrous material and aerogel, and aerogel layer 102 positioned on an upper surface (corresponding to a first surface or a second surface) and a lower surface (corresponding to a second surface or a first surface) of composite layer 101. Aerogel layer 102 is provided on at least one surface of aerogel layer 102. Aerogel layer 102 includes a plurality of projection portions 103 that project to an opposite side to composite layer 101 when aerogel structure body 110 is viewed in a plan view. Here, a plan view shape of each projection portion 103 is a general elliptical shape (including an elliptical shape).

Since projection portions 103 have a higher color tone than a region (hereinafter, flat portion 104) other than where projection portions 103 of aerogel layer 102 exist, projection portions 103 are viewed brighter and whiter. It is presumed that the above reason is that light is easily transmitted through projection portions 103, for example. Therefore, in a case where aerogel structure body 110 is exposed to light, projection portions 103 can be easily confirmed visually. In this case, an intensity (luminous intensity) of light in the case where aerogel structure body 110 is exposed to the light may be, for example, a luminous intensity of 1 cd or greater. Therefore, projection portions 103 can be easily confirmed by using a general fluorescent lamp, general LED illumination, or the like as a light source. Aerogel has a network structure in which particles of silica aerogel are connected to each other by point contact.

Thickness of Aerogel Structure Body 110

A thickness of aerogel structure body 110 is preferably in the range of 0.1 mm or greater and 3.0 mm or smaller. Furthermore, the thickness of aerogel structure body 110 is more preferably in the range of 0.5 mm or greater and 1.5 mm or smaller. The reason is that in a case where aerogel structure body 110 is used as a heat insulating material, it is difficult to obtain sufficient heat insulating performance in a thickness direction in a case where the thickness of aerogel structure body 110 is smaller than 0.1 mm. In addition, in a case where the thickness of aerogel structure body 110 is greater than 3.0 mm, it is difficult to incorporate aerogel structure body 110 into a thin and small device. Therefore, the thickness of aerogel structure body 110 is preferably within the above range.

Density of Aerogel Structure Body 110

A density of aerogel structure body 110 is preferably in the range of 0.3 g/cm$^3$ or greater and 0.6 g/cm$^3$ or smaller.

That is, the preferable density range of aerogel structure body 110 is set from the two viewpoints of the heat insulating performance required to be included in aerogel structure body 110 and a mechanical strength.

From the viewpoint of the heat insulating performance, as the density of aerogel structure body 110 increases, an average pore size of the aerogel particles is small, and a proportion of a heat conductive component in a solid increases, so that the heat insulating performance deteriorates. On the other hand, as the density of aerogel structure body 110 decreases, the proportion of the heat conductive component in the solid decreases, but a proportion of aerogel voids increases. Therefore, the influence of air convection in aerogel structure body 110 increases, so that it is difficult to obtain higher heat insulating performance.

From the viewpoint of mechanical strength, as the density of aerogel structure body 110 increases, rigidity increases. On the other hand, as the density of aerogel structure body 110 decreases, the rigidity decreases. Therefore, in a case where the density decreases, aerogel structure body 110 is difficult to withstand the fastening force in a case of assembling a heat-insulated unit that contains aerogel structure body 110 as a heat insulating material.

Therefore, aerogel structure body 110 of the present exemplary embodiment is set within the above density region in order to achieve both the heat insulating performance and the mechanical strength in consideration of the application as the heat insulating material.

Thermal Conductivity of Aerogel Structure Body 110

A thermal conductivity of aerogel structure body 110 is preferably 0.02 W/(m·K) or greater and 0.06 W/(m·K) or smaller.

Here, a thermal conductivity of the non-woven fabric as an example of the fibrous material is 0.03 W/(m·K) to 0.06 W/(m·K). A thermal conductivity of aerogel is 0.01 W/(m·K) to 0.025 W/(m V.

Aerogel structure body 110 of the present exemplary embodiment is configured as described above.

Compression Rate of Aerogel Structure Body 110

A compression rate of aerogel structure body 110 in a case of being pressurized at 5 MPa is 40% or smaller, and even more preferably 30% or smaller.

Composite Layer 101

Next, composite layer 101 of aerogel structure body 110 will be described.

Composite layer 101 is a main component of aerogel structure body 110 and includes a fibrous material and aerogel.

In the present exemplary embodiment, a non-woven fabric is adopted as the fibrous material for composite layer 101, and aerogel is disposed between fibers of the non-woven fabric.

Thickness of Non-Woven Fabric

In general, a non-woven fabric has a large variation in thickness, although the non-woven fabric varies depending on manufacturing methods.

Therefore, composite layer 101 of the present exemplary embodiment is formed such that, firstly, a space volume in the non-woven fabric is filled with aerogel, and then aerogel layer 102 and projection portion 103 are formed on an upper surface and a lower surface of composite layer 101, respectively. As a result, the variation in thickness of the non-woven fabric is absorbed and alleviated.

Therefore, as the non-woven fabric for forming composite layer 101, it is preferable to select a non-woven fabric having a thickness in a range of 60% to 99% with respect to a preferable thickness (0.1 mm or greater and 3.0 mm or smaller, and more preferably 0.5 mm or greater and 1.5 mm or smaller) of aerogel structure body 110 described above. Since the thickness of the non-woven fabric is within this range, it is possible to absorb and alleviate the variation in thickness of the non-woven fabric while maintaining flexibility peculiar to the non-woven fabric.

Bulk Density of Non-Woven Fabric

A bulk density of the non-woven fabric is preferably in the range of 100 kg/m$^3$ or greater and 500 kg/m$^3$ or smaller.

Since the non-woven fabric having the bulk density is adopted, a content of aerogel in aerogel structure body 110 can be increased and the thermal conductivity can be reduced. In addition, since the non-woven fabric having a bulk density of 100 kg/m$^3$ or greater, the mechanical strength as a continuum can be ensured. In this case, a porosity of the non-woven fabric is preferably 85% or greater, and more preferably 90% or greater.

Material of Non-Woven Fabric Fiber

As materials of the non-woven fabric used for composite layer 101, inorganic fiber-based glass wool or rock wool, organic fiber-based polyethylene terephthalate (PET), polyphenylene sulfide (PPS), polypropylene (PP), polytetrafluoroethylene (PTFE), natural wool, cellulose, and the like can be used. Among these, an inorganic fiber-based non-woven fabric is particularly preferable.

Average Diameter of Non-Woven Fabric Fibers

An average diameter of fibers used in the non-woven fabric is preferably 0.1 µm or greater and 10 µm or smaller. Furthermore, the average diameter of fibers is more preferably 0.3 µm or greater and 5 µm or smaller.

The reason why the above range is preferable is as follows.

In a case where the average diameter of fibers is smaller than 0.1 µm, manufacturing and handling the fibers are difficult, which may reduce economic efficiency. In addition, in a case where the average diameter of fibers is greater than 10 µm, the porosity of the non-woven fabric decreases. Therefore, there is a problem that the preferable heat insulating performance of aerogel structure body 110 cannot be ensured.

Composite layer 101 of aerogel structure body 110 of the present exemplary embodiment is configured as described above.

Aerogel Layer 102

Next, aerogel layer 102 of aerogel structure body 110 will be described.

Aerogel layer 102 is formed on both surfaces of composite layer 101 with a thickness of at least 0.01 mm or greater. Aerogel layer 102 is a single layer formed of only aerogel.

In addition, aerogel layer 102 has a network structure formed by connecting aerogel particles in the order of several tens of nanometers.

In a case where aerogel layer 102 is made thicker, the heat insulating performance is improved, but a possibility that aerogel layer 102 is peeled off from composite layer 101 is also increased. Therefore, the thickness of aerogel layer 102 is preferably 0.2 mm or smaller. That is, in the present exemplary embodiment, the thickness of the aerogel layer is preferably 0.01 mm or greater and 0.2 mm or smaller. Aerogel layer 102 preferably does not contain fibers and may consist only of aerogel.

Projection Portion 103

As described above, projection portion 103 is a portion of aerogel layer 102 that projects from a surface opposite to composite layer 101. Projection portion 103 consists of only aerogel in the same manner as aerogel layer 102.

Projection portion 103 is 10 µm to 30 µm thicker than flat portion 104 around aerogel layer 102.

In projection portion 103, aerogel particles forming projection portion 103 are connected through a continuous network structure continuous with aerogel particles of aerogel layer 102.

Method of Manufacturing Aerogel Structure Body 110

Hereinafter, an example of a method of manufacturing aerogel structure body 110 will be described with reference to FIG. 2.

Figure 2:
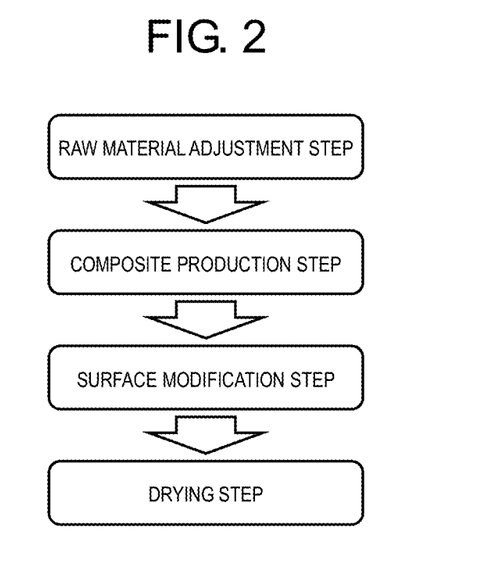
FIG. 2 is a step diagram of a method of manufacturing an aerogel structure body.

FIG. 2 is a step diagram of a method of manufacturing aerogel structure body 110. The method of manufacturing aerogel structure body 110 includes (a) a raw material adjustment step, (b) a composite production step, (c) a surface modification step, (d) a drying step, and the like, which will be individually described below.

(a) Raw Material Adjustment Step

Hereinafter, as an example, a manufacturing method will be described by employing silica aerogel as the aerogel.

As a raw material of the silica aerogel, a general-purpose silica raw material such as alkoxysilane, water glass, or the like is used. In particular, water glass is often used to produce silica aerogel having a high-density porous structure. In the present exemplary embodiment, a dispersion or a solution obtained by dispersing or dissolving the silica raw material in water is used so that a silica concentration is in the desired range. In order to synthesize a high-density aerogel, the silica concentration in the dispersion or the solution is preferably high, and particularly preferably 14% by weight or greater and 22% by weight or smaller.

In the present exemplary embodiment, a carbonate ester is used as a gelation agent for gelling the dispersion or a solution of the silica raw material. The carbonate ester is known to hydrolyze into carbonic acid and alcohol under basic conditions. Therefore, in the present exemplary embodiment, the carbonic acid generated by this hydrolysis is used for gelation.

Specific examples of the carbonate ester include dimethyl carbonate, diethyl carbonate, dipropyl carbonate, ethyl methyl carbonate, ethylene carbonate, propylene carbonate, and the like. In particular, from the viewpoint of solubility of the carbonate ester in water and a rate of hydrolysis reaction, it is preferable to use dimethyl carbonate or ethylene carbonate, which has a relatively short alkyl chain and is relatively soluble in water.

The addition amount of the carbonate ester is preferably 1.0 part by weight or greater and 10.0 parts by weight or smaller with respect to 100 parts by weight of the total amount of the silica raw material (water glass composition), and more preferably 3.0 parts by weight or greater and 6.0 parts by weight. With this addition amount, the uniform gel can be produced. The carbonate ester may be mixed with a raw material dispersion or a solution in a state of being dissolved or dispersed in water. As a result, the compression rate of the produced heat insulating material is improved.

(b) Composite Production Step

The composite production step is a step of impregnating a non-woven fabric with a basic sol (hereinafter referred to as a "sol") produced by mixing a water glass composition with a carbonate ester, and gelling the sol.

In the present exemplary embodiment, the composite production step employs a roll-to-roll method in consideration of productivity to produce a composite.

Here, in the roll-to-roll method, first, a nozzle for continuously discharging a sol is swung in the width direction of the non-woven fabric while continuously transporting the non-woven fabric placed on a film. Then, the sol is added dropwise onto the non-woven fabric from above from the swung nozzle, so that the non-woven fabric is impregnated with the sol. In the present exemplary embodiment, in order to allow the impregnated non-woven fabric to travel stably, the film is moved to an open surface side after the sol is added dropwise, and the film is stuck with the non-woven fabric by a roll (the impregnated non-woven fabric is sandwiched between the films from both sides). As a result, not only the non-woven fabric can be stably travels, but also the thickness can be easily adjusted and made uniform, and the production equipment can be prevented from being contaminated.

As an example of a swing pattern of the nozzle, an operation of discontinuously moving between two or more stop points that are set along a direction intersecting a transport direction of the non-woven fabric is employed. The "operation of discontinuously moving" means that, specifically, the nozzle intermittently repeatedly moves between the stop points and pauses at the stop points. The nozzle is mechanically swung by, for example, a swing mechanism (not illustrated). In the present exemplary embodiment, for example, three stop points are provided at the left and right ends in the width direction of the non-woven fabric and at the center.

By the operation of the nozzle, a first region and a second region are formed on the non-woven fabric that is continuously transported toward a predetermined transport direction. The first region is a region where the sol discharged from the nozzle is added dropwise at the stop point. The second region is a region other than the first region.

That is, as described above, in the first region, there is a sol that is continuously discharged from the nozzle in a state of being paused. Therefore, the amount of a sol present in the first region is larger than that in the second region where the sol discharged from the nozzle while moving between the stop points is present.

The supplied amount of the sol discharged from the nozzle is constant, and is set to, for example, a first supplied amount. That is, the supplied amount is set to the first supplied amount that is greater than the reference amount allowing the non-woven fabric to be sufficiently impregnated even in the second region where the amount of a sol is relatively small. This is because of making the sol exuded in a thickness direction of the non-woven fabric by impregnating the non-woven fabric with an excessive amount of sol.

By this composite production step, as illustrated in FIGS. 1A and 1B, aerogel layers 102 are formed to be disposed on both surfaces of composite layer 101 in the manufactured aerogel structure body. The reference amount of the sol that allows the non-woven fabric to be sufficiently impregnated is preferably set based on a theoretical space volume in the non-woven fabric, which is calculated from the bulk density of the non-woven fabric.

Hereinafter, in the composite production step, the distribution of a sol in non-woven fabric 201 that is continuously transported toward the transport direction will be described with reference to FIG. 3.

Figure 3:
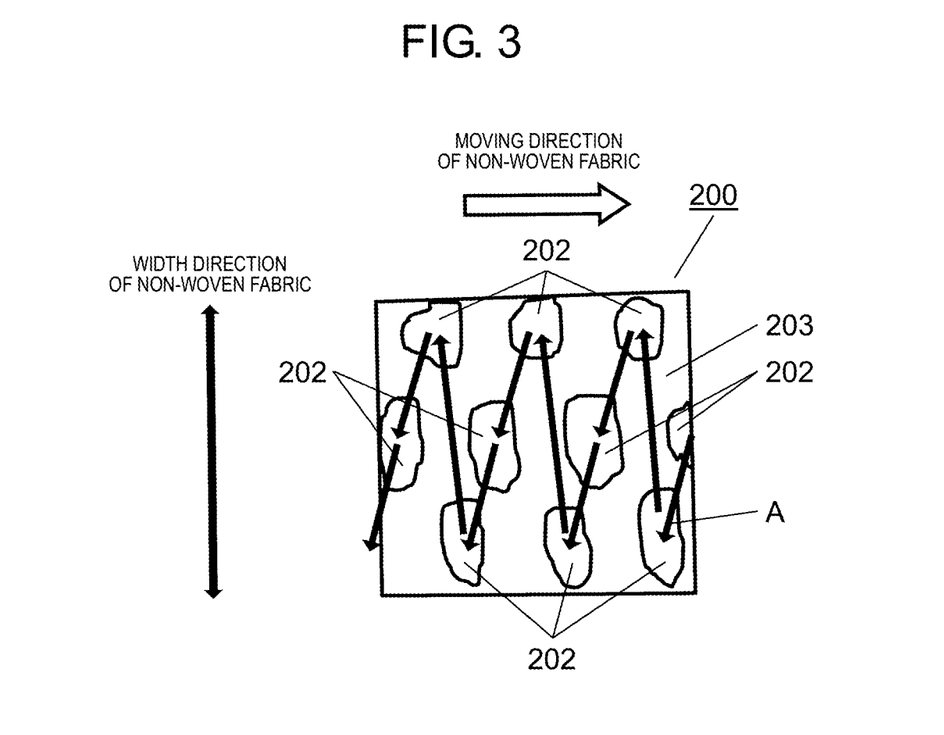
FIG. 3 is a diagram for explaining the distribution of a sol in a non-woven fabric that is continuously transported toward a transport direction.

FIG. 3 is a diagram for explaining the distribution of a sol in non-woven fabric 201 that is continuously transported toward the transport direction.

As described above, the sol is added dropwise onto the non-woven fabric that is continuously transported by using the nozzle operated along a direction that intersects the width direction of the non-woven fabric. In this case, the movement of the nozzle as viewed from the non-woven fabric is as illustrated by arrows A in FIG. 3. An example in a case where the nozzle repeatedly moves to the three stop points that are set at three places of the left, the center, and the right with respect to the transport direction of the non-woven fabric in an order of left, center, right, left, and so on is illustrated in FIG. 3.

By such operation of the nozzle, first region 202 having a relatively large amount of a sol and second region 203 having a relatively small amount of a sol are formed on non-woven fabric 201. The first region is a region where the sol discharged from the nozzle paused at any of the three stop points is present. The second region is a region where the sol discharged from the nozzle while moving between the stop points is present.

As described above, due to the composite production step, an excessive amount of sol is supplied in the vicinity of the first region where the sol discharged from the nozzle while being paused at the stop point is present. Therefore, the surplus sol that cannot be completely absorbed in voids inside the non-woven fabric is added in the thickness direction or protrudes from an end surface of the non-woven fabric.

That is, in aerogel structure body 110 of the present exemplary embodiment, projection portion 103 illustrated in FIGS. 1A and 1B is a portion formed by adding the above described surplus sol in the thickness direction. Therefore, projection portion 103 is thicker than the other regions.

As described above, projection portion 103 has a substantially elliptical shape, and the reason for projection portion 103 having a substantially elliptical shape is considered that a pressing force in a case where the film is attached to the composite acts on the sol and the sol is pushed and spread.

Hereinafter, an example of a state where non-woven fabric 201 is impregnated with the sol in the composite production step will be described with reference to FIGS. 4A and 4B.

Figure 4A:
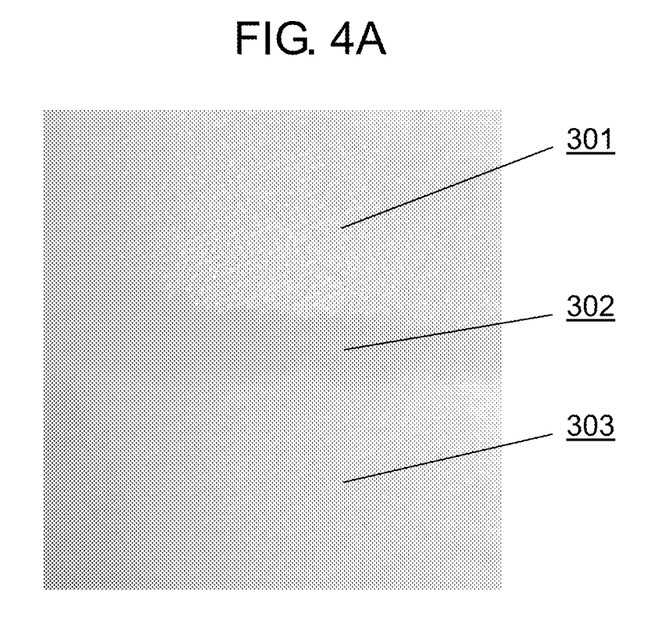
FIG. 4A is a diagram illustrating a state in which the non-woven fabric is impregnated with the sol.
Figure 4B:
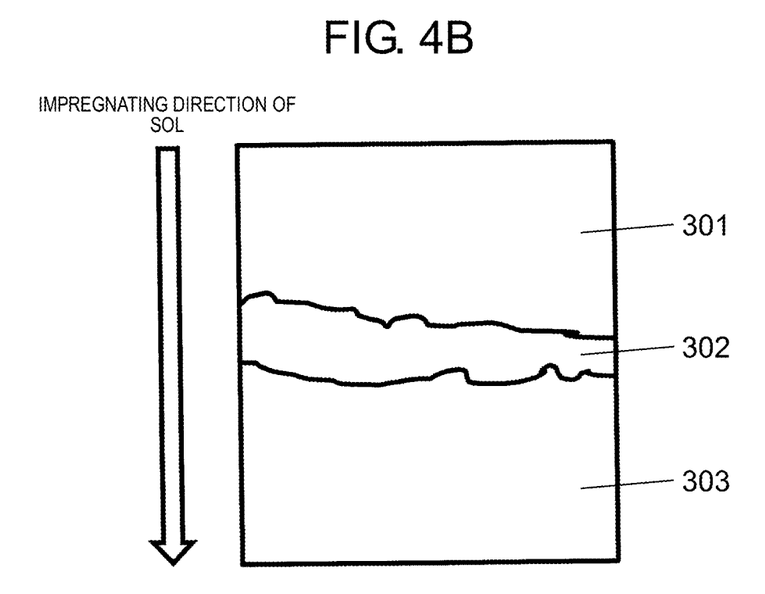
FIG. 4B is a diagram illustrating a state in which the non-woven fabric is impregnated with the sol.

FIGS. 4A and 4B are diagrams illustrating a state in which the non-woven fabric is impregnated with the sol. Specifically, FIG. 4A is a photograph illustrating the state in which the non-woven fabric is impregnated with the sol. FIG. 4B is a schematic diagram illustrating the state in which the non-woven fabric is impregnated with the sol.

That is, FIGS. 4A and 4B illustrate the states in which a region where the non-woven fabric is impregnated with the sol expands.

As illustrated in FIGS. 4A and 4B, a region separated into third region 301, fourth region 302, and fifth region 303 is included near the boundary between the region where the non-woven fabric is impregnated with the sol and a region where the non-woven fabric is not impregnated with the sol. Third region 301 is a region where the non-woven fabric is sufficiently impregnated with the sol up to both surfaces thereof. Fourth region 302 is a region where the non-woven fabric is slightly impregnated with gel, but the non-woven fabric is not sufficiently impregnated with the gel up to both surfaces thereof. Fifth region 303 is a region in a state in which the non-woven fabric is not impregnated with the gel.

Specifically, in a case where the sol is added dropwise onto the non-woven fabric installed on the film (not illustrated), the gel spreads in each of the plane direction and the thickness direction. More specifically, in a case where the sol is placed dropwise on the non-woven fabric, the sol added dropwise onto the non-woven fabric spreads in the plane direction and also spreads in the thickness direction due to capillary phenomenon formed by the fibers of the non-woven fabric. Then, the sol that has once exuded to a rear surface spreads in the plane direction along the film disposed below the non-woven fabric.

Therefore, it is important to dispose the film at least on the lower side of the non-woven fabric and preferably also dispose the film on the upper surface, and to set a sufficiently supplied amount of the sol. As a result, the non-woven fabric can be sufficiently impregnated with the sol in the plane direction of the non-woven fabric.

Therefore, after the non-woven fabric is impregnated with an appropriate amount of the sol, the film is placed from above the composite formed of the non-woven fabric and the sol. As a result, both surfaces of the composite are sandwiched between the films so that the sol with which the non-woven fabric is impregnated does not flow down. Then, in the composite sandwiched between the films, the gelling is carried out during the transportation process. In this case, the thickness is adjusted by using a biaxial roll or the like at an appropriate timing. As a result, a more homogeneous composite can produced.

(c) Surface Modification Step

The composite formed of the hydrogel and non-woven fabric, which is produced in the composite production step (b), is mixed with a silylating agent to modify a surface. As a silylating method and the silylating agent, a known method and a known material can be employed. In particular, the following method is preferable since silylating treatment can be performed quickly. That is, first, the composite formed of the hydrogel and non-woven fabric is immersed in an aqueous hydrochloric acid solution. Thereafter, the composite impregnated with the aqueous hydrochloric acid solution is treated with a mixed solution of siloxane and alcohol. As a result, the composite can be rapidly silylated.

(d) Drying Step

A liquid contained in the surface-modified composite formed of the hydrogel and non-woven fabric, which is obtained in the surface modification step (c), is removed by drying at a critical temperature of the liquid at a lower pressure than critical pressure of the liquid. As a result, aerogel structure body 110 of the present exemplary embodiment is obtained.

In a case where a carbonate ester is added as a gelation agent to the water glass composition in the composite production step (b), sodium carbonate is produced together with dehydration and condensation of silicic acid. Therefore, sodium carbonate may be incorporated into the gel to obtain a very basic hydrogel. In this case, in a case where the very basic hydrogel is immersed in hydrochloric acid in the surface modification step (c), a neutralization reaction between hydrochloric acid and sodium carbonate occurs, and carbon dioxide gas is rapidly generated. In this case, in a case where fibers of the non-woven fabric such as glass paper, which are less entangled with each other, are used, a large number of bubbles may be generated in a fiber sheet due to the generation of carbon dioxide gas. Therefore, before the surface modification step (c) of immersing the very basic hydrogel in hydrochloric acid, sodium carbonate in the hydrogel may be removed by washing with water.

Aerogel structure body 110 of the present exemplary embodiment is manufactured as described above.

Example

Hereinafter, an example of an aerogel structure body manufactured by the manufacturing method of the above described exemplary embodiment will be described with reference to FIGS. 5A and 5B. The following exemplary example is an example, and the present disclosure is not limited to these examples.

In addition, the manufacture of the aerogel structure body in the example was carried out under the atmosphere by adjusting the raw materials so that a silica concentration was 20% by weight in the manufacturing method of the above described embodiment. Furthermore, each parameter such as the thickness, bulk density, material, average diameter of fibers of the non-woven fabric, the thickness of the aerogel layer, and the thickness of the projection portion was adjusted to be within a preferable range, and the aerogel structure body of the example was manufactured.

Figure 5A:
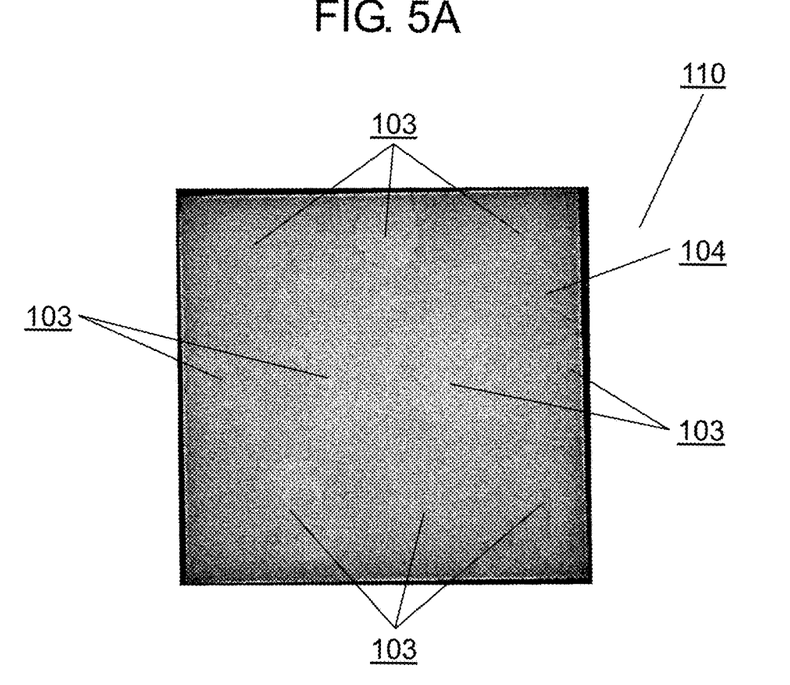
FIG. 5A is a diagram illustrating an appearance of the aerogel structure body.
Figure 5B:
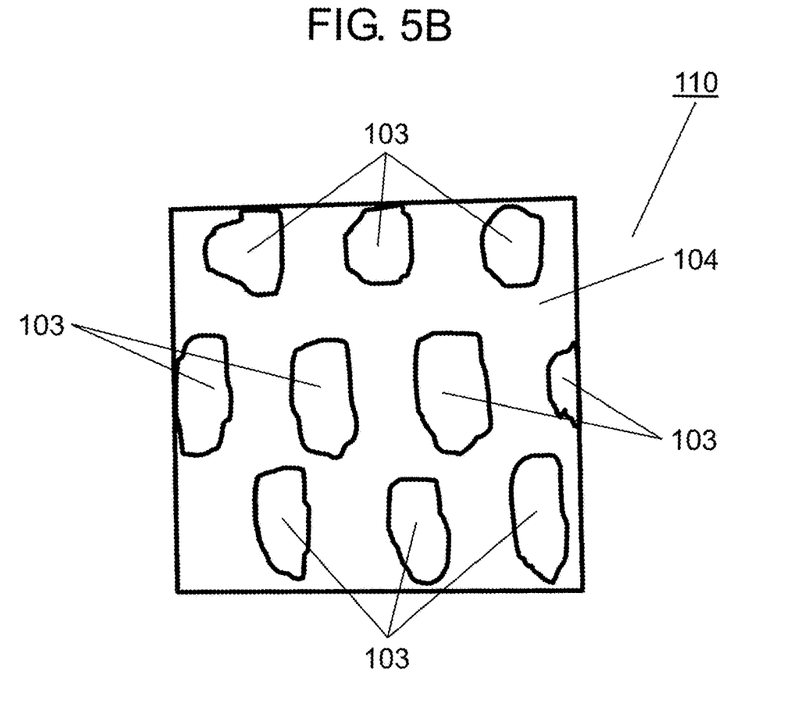
FIG. 5B is a diagram illustrating the appearance of the aerogel structure body.

FIGS. 5A and 5B are diagrams illustrating an appearance of the aerogel structure body according to the example, which is produced under the above conditions. Specifically, FIG. 5A is an appearance photograph of the aerogel structure body. FIG. 5B is a schematic diagram of the aerogel structure body.

As illustrated in FIGS. 5A and 5B, projection portions 103 are formed to project from flat portion 104 of aerogel layer 102 in a direction perpendicular to the page of each of FIGS. 5A and 5B. Each projection portion 103 is a portion corresponding to first region 202 (see FIG. 3) formed at the stop point of the nozzle described above.

The appearance, thickness, density, compression rate, thermal conductivity, and thermal resistance value of the obtained aerogel structure body were evaluated as follows.

Appearance Evaluation

The appearance evaluation of the aerogel structure body of the example produced by the manufacturing method of the present exemplary embodiment was carried out in a dark room by transmitting illumination light from a rear surface of the aerogel structure body. The present disclosure is not limited to the above method, and the appearance may be evaluated by transmitting illumination (LED illumination or the like) having a higher luminous intensity than the environmental illumination from the rear surface in an indoor environment under general fluorescent lamp illumination.

As a result, the projection portions projecting from the aerogel layers on both surfaces of the aerogel structure body had a higher color tone (brighter and whiter) than peripheral regions. Therefore, as described above, it is possible to easily determine whether or not the projection portion is appropriately formed after the aerogel structure body is manufactured.

Evaluation of Thickness, Density, Compression rate, Thermal Conductivity, Thermal Resistance Value The thickness was evaluated using the Digimatic Indicator H0530 (manufactured by Mitutoyo Corporation).

In this case, the measured pressure was 7.4 kPa. As for the measurement points, first, 13 points were selected from the in-plane of the aerogel structure body in the vicinity of the center of the projection portion, and 10 points were selected in the vicinity of the center of the flat portion, which is a portion around the projection portion of the aerogel layer. Then, the aerogel structure body was cut based on each of the selected points into a 20 mm square size, and thicknesses were evaluated.

As a result of the measurement, a thickness of the projection portion (average value) was 1.148 mm, and a thickness of the flat portion (average value) was 1.126 mm. That is, the projection portion was 0.022 mm thicker, about 2.0% thicker than the flat portion around the projection portion.

In a case where minimum values of the thicknesses of the projection portion and the flat portion were compared with each other, the projection portion was 0.9% thicker than the flat portion, and in a case of comparing maximum values with each other, the projection portion was 2.6% thicker than the flat portion. That is, it was found that the projection portion could be formed sufficiently thicker than the flat portion.

As described above, the projection portions project from the flat portion. Therefore, in a case where compressive force is applied to the aerogel structure body, the projection portions receive the compressive force intensively. As a result, it is possible to prevent the compressive force from being applied to the flat portion. Even in a case where compressive force having a predetermined value or greater is applied, the structure of the flat portion can be secured by crushing the projection portion first.

On the other hand, in a case where the aerogel structure body is used as a heat insulating material, a plurality of aerogel structure bodies are disposed to be sandwiched between heat-insulated units. Therefore, it is preferable that the thickness of the projection portion is not increased too much.

In the aerogel structure body manufactured by the manufacturing method of the present exemplary embodiment, the projection portion can be formed thicker than the flat portion, and the thickness increment of the projection portion can be suppressed within a suitable range. Therefore, it is possible to achieve both the structural secure performance of the aerogel structure body and the incorporation performance into the heat-insulated unit.

The density evaluation was calculated by dividing a weight of each of the above described cut pieces by a volume, and an average value thereof was evaluated. As a result of the calculation, a density of the projection portion was 0.465 g/cm$^3$, and a density of the flat portion was 0.458 g/cm$^3$. That is, in a case where the densities of the projection portion and the flat portion were compared with each other, the density of the projection portion was about 1.5% higher.

In a case where minimum values of the densities of the projection portion and the flat portion were compared with each other, the projection portions were 0.03% greater than the flat portion, and in a case of comparing maximum values with each other, the projection portions were 2.1% greater than the flat portion. That is, it was found that the projection portion could be formed to have a sufficiently higher density than the flat portion.

The density of the projection portion in the aerogel structure body is preferably 0.1% to 3.0% higher than the density of the flat portion. In a case where the density of the projection portion is higher than the density of the flat portion by more than 3.0%, the thickness of the projection portion increases too much, which may impair assembling properties. In a case where the difference between the density of the projection portion and the density of the flat portion is smaller than 0.1%, the densities of the projection portion and the flat portion are almost the same. Therefore, there is a possibility that the projection portion cannot sufficiently secure the structure of the aerogel structure body.

The compression rate was evaluated by an average value of changes in compression behaviors in a range of 1 MPa to 5 MPa corresponding to fastening force and a load of the aerogel structure body. The fastening force and the load are values close to a value of the actual usage environment of the aerogel structure body. That is, it is assumed that the fastening force required for assembling the heat-insulated unit is 1 MPa and the maximum load during the use is 5 MPa. As test samples, the above described cut pieces were used. As a measuring machine, a universal tensile tester AUTOGRAPH-AGS-X (manufactured by Shimadzu Corporation) was used.

The evaluation result of the compression rate was 3.39% for the projection portion and 3.56% for the flat portion. That is, in a case where the compression rates of the projection portion and the flat portion were compared with each other, the compression rate of the projection portion was about 5.1% lower. In a case where minimum values of the compression rates of the projection portion and the flat portion were compared with each other, the projection portion was 0.6% lower than the flat portion, and in a case of comparing maximum values with each other, the projection portion was 15.1% lower than the flat portion. That is, it was found that the projection portion could be formed to have a sufficiently lower compression rate than the flat portion.

The compression rate of the projection portion in the aerogel structure body is preferably 0.1% to 20% lower than the compression rate of the flat portion. In a case where the compression rate of the projection portion is lower than that of the flat portion by greater than 20%, void portions of the aerogel are not formed in the projection portion. Therefore, the entire aerogel structure body may not be possible to ensure sufficient heat insulating performance. In addition, in a case where the difference between the compression rate of the projection portion and the compression rate of the flat portion is smaller than 0.1%, the compression rates of the projection portion and the flat portion are almost the same. Therefore, in a case where the compressive force is applied to the aerogel structure body, it is difficult to receive the applied compressive force at the projection portions. That is, the compression rate is preferably in the above range.

The aerogel structure body of the present exemplary embodiment is manufactured using a raw material having a silica concentration of 20% by weight. As a result, it is possible to achieve both reactivity during the manufacturing of aerogel and suppression of compressive strain. That is, the aerogel structure body of the present exemplary embodiment has a compressive strain suppressed within 5%.

The thermal conductivity was evaluated by measuring thermal conductivities at any 6 points of the aerogel structure body before cutting, which includes the projection portion and the flat portion, instead of the above described cut pieces, and calculating an average value. As a measuring machine, a heat flow meter HFM436 Lamda (manufactured by NETZSCH Group) was used. The evaluation result was 49.18 mW/(m·K).

The thermal resistance value was calculated and evaluated by dividing an average value of the thicknesses in a case where each of the above described cut pieces was pressed at 5 MPa by the thermal conductivity. The evaluation results were 0.022 m$^2$ K/W for the projection portion and 0.021 m$^2$ K/W for the flat portion.

Summary of Evaluation

Hereinafter, the evaluation results of the projection portion and the flat portion of the aerogel structure body according to the above example is illustrated in Table 1.

TABLE 1

| | Projection portion | Flat portion | Note |
|---|---|---|---|
| Appearance | Projection portion is viewed to have higher color tone | Flat portion is viewed to have lower color tone | Substantially elliptical shape |
| Average thickness (mm) | 1.148 | 1.126 | No load is applied |
| Average thickness (mm) | 1.107 | 1.089 | 1 MPa is applied |
| Average thickness (mm) | 1.069 | 1.051 | 5 MPa is applied |
| Average density (g/cm$^3$) | 0.465 | 0.458 | No load is applied |
| Average compression rate (%) | 3.39 | 3.56 | 1 MPa→5 MPa |
| Average thermal conductivity (mW/(m · K)) | 49.18 | (The same as projection portion) | — |
| Thermal resistance value (m$^2$ K/W) | 0.022 | 0.021 | — |

Action and Effect

As described above, aerogel structure body 110 of the present disclosure includes composite layer 101 that contains fibrous materials and aerogel, the aerogel being held between the fibrous materials, and aerogel layer 102 having a first surface on at least one surface of composite layer 101 and formed of the aerogel. Aerogel layer 102 having a second surface opposite to the first surface, the second surface including projection portion 103 projecting from the second surface. A density of the aerogel in projection portion 103 is 0.1% to 3.0% higher than a density of the aerogel in aerogel layer 102 (flat portion 104) other than the projection portion 103.

According to this configuration, aerogel structure body 110 according to the present disclosure has a structure in which aerogel having high heat insulating properties is held by a fibrous material. Therefore, it is useful as a heat insulating material. In addition, projection portion 103 is thicker than flat portion 104 and has excellent compression characteristics. Therefore, aerogel structure body 110 is sandwiched in a narrow space, and projection portion 103 is crushed in an environment where compressive stress acts, so that damage to flat portion 104 is preferably reduced. The density of the aerogel in projection portion 103 is 0.1% to 3.0% higher than the density of the aerogel in flat portion 104. Therefore, even though stress is applied to aerogel structure body 110 from the outside, the projection portion can sufficiently secure the structure of the aerogel structure body. As a result, high dimensional stability of aerogel structure body 110 can be ensured. In addition, the thickness of projection portion 103 may not be too thick as compared with flat portion 104. Therefore, in a case where aerogel structure body 110 is incorporated into the heat-insulated unit as a heat insulating material, sufficient assembling properties can be ensured.

Furthermore, aerogel structure body 110 includes a plurality of projection portions provided on the surface thereof, each of which has a higher color tone (brighter and whiter) than flat portion 104. Therefore, image recognition is facilitated, and the appearance effect of improving appearance verifiability can be obtained. The image recognition is performed in order to identify the manufactured aerogel structure body in a manufacturing stage and an inspection stage of aerogel structure body 110.

The method of manufacturing an aerogel structure body of the present disclosure includes the composite production step of applying the sol to the fibrous material that is continuously transported toward the transport direction, impregnating the fibrous material, and producing the composite of the fibrous material and hydrogel, the surface modification step of modifying the surface of the composite, and the drying step of drying the composite to produce aerogel structure body 110. Then, in the composite production step, the sol discharged from the nozzle that moves discontinuously along the direction intersecting the transport direction of the fibrous material is applied to the fibrous material.

According to this method, aerogel structure body 110 can be manufactured by using a continuous manufacturing method such as a roll-to-roll method. Thereby, the productivity of aerogel structure body 110 can be improved.

What is claimed is:

1. An aerogel structure body comprising:
a composite layer containing fibrous materials and aerogel, wherein the aerogel is held between the fibrous materials and wherein the aerogel has a porous structure including particles of silica aerogel connected to each other; and
an aerogel layer having a first surface on at least one surface of the composite layer and formed of the aerogel,
wherein the aerogel layer has a second surface opposite to the first surface, and the second surface includes a projection portion projecting from the second surface,
a density of the aerogel in the projection portion is 0.1% to 3.0% higher than a density of the aerogel in the aerogel layer other than the projection portion,
a concentration of the aerogel in the projection portion is higher than a concentration of the aerogel in the aerogel layer other than the projection portion, and
a compression rate of the projection portion with respect to a pressure of 1.0 MPa or greater and 5.0 MPa or smaller applied to the projection portion is 0.1% to 20% lower than a compression rate of the aerogel layer other than the projection portion with respect to a pressure of 1.0 MPa or greater and 5.0 MPa or smaller applied to the aerogel layer other than the projection portion.

2. The aerogel structure body of claim 1, wherein the projection portion has an elliptical shape in a plan view shape.

3. The aerogel structure body of claim 1, wherein an average diameter of the fibrous materials is 0.1 μm or greater and 10 μm or smaller, and a porosity of the composite layer is 90% or greater.

4. The aerogel structure body of claim 1, wherein the projection portion has a higher color tone than a portion other than the projection portion in the aerogel structure body.

5. The aerogel structure body of claim 1,
wherein the aerogel has a network structure in which the particles of silica aerogel are connected to each other by point contact.

6. The aerogel structure body of claim 1, wherein the projection portion is visually perceived in a case where the aerogel structure body is exposed to light.

7. The aerogel structure body of claim 1, wherein a thermal conductivity of the aerogel structure body is 0.02 W/(m·K) or greater and 0.06 W/(m·K) or smaller.

8. The aerogel structure body of claim 1, wherein a compression rate of the aerogel structure body in a case of being pressurized at 5 MPa is 40% or less.

9. An aerogel structure body comprising:
a composite layer containing fibrous materials and aerogel, wherein the aerogel is held between the fibrous materials and wherein the aerogel has a porous structure including particles of silica aerogel connected to each other; and
an aerogel layer having a first surface on at least one surface of the composite layer and formed of the aerogel,
wherein the aerogel layer has a second surface opposite to the first surface, and the second surface includes a projection portion projecting from the second surface,
a concentration of the aerogel in the projection portion is higher than a concentration of the aerogel in the aerogel layer other than the projection portion, and
a compression rate of the projection portion with respect to a pressure of 1.0 MPa or greater and 5.0 MPa or smaller applied to the projection portion is 0.1% to 20% lower than a compression rate of the aerogel layer other than the projection portion with respect to a pressure of 1.0 MPa or greater and 5.0 MPa or smaller applied to the aerogel layer other than the projection portion.

10. The aerogel structure body of claim 9, wherein the projection portion has an elliptical shape in a plan view shape.

11. The aerogel structure body of claim 9, wherein the projection portion has a higher color tone than a portion other than the projection portion in the aerogel structure body.

12. The aerogel structure body of claim 9, wherein the aerogel has a network structure in which the particles of silica aerogel are connected to each other by point contact.

13. The aerogel structure body of claim 9, wherein the projection portion is visually perceived in a case where the aerogel structure body is exposed to light.

* * * * *